(12) United States Patent
Terry

(10) Patent No.: US 8,954,729 B2
(45) Date of Patent: Feb. 10, 2015

(54) CREATING AND USING A SPECIFIC USER UNIQUE ID FOR SECURITY LOGIN AUTHENTICATION

(71) Applicant: CW International, LLC, Ellwood City, PA (US)

(72) Inventor: Robert F. Terry, Old Hickory, TN (US)

(73) Assignee: CW International, LLC, Ellwood City, PA (US)

( * ) Notice: Subject to any disclaimer, the term of this patent is extended or adjusted under 35 U.S.C. 154(b) by 140 days.

(21) Appl. No.: 13/789,248

(22) Filed: Mar. 7, 2013

(65) Prior Publication Data

US 2014/0173273 A1    Jun. 19, 2014

Related U.S. Application Data

(63) Continuation of application No. 12/440,312, filed as application No. PCT/US2007/077914 on Sep. 7, 2007, now abandoned.

(60) Provisional application No. 60/824,835, filed on Sep. 7, 2006.

(51) Int. Cl.
| | |
|---|---|
| *H04L 29/00* | (2006.01) |
| *H04L 29/06* | (2006.01) |
| *G06F 21/31* | (2013.01) |
| *G06F 21/55* | (2013.01) |
| *G06F 21/73* | (2013.01) |

(52) U.S. Cl.
CPC ............ *H04L 63/0485* (2013.01); *G06F 21/31* (2013.01); *G06F 21/554* (2013.01); *G06F 21/73* (2013.01); *H04L 63/0876* (2013.01); *G06F 2221/2129* (2013.01); *H04L 63/083* (2013.01)
USPC ................... 713/155; 713/183; 726/3; 380/28

(58) Field of Classification Search
CPC ............ H04L 63/0485; H04L 63/0876; H04L 63/083; G06F 21/31; G06F 51/554; G06F 21/73
See application file for complete search history.

(56) References Cited

U.S. PATENT DOCUMENTS

| | | | |
|---|---|---|---|
| 6,212,544 | B1 | 4/2001 | Borkenhagen et al. |
| 7,051,329 | B1 | 5/2006 | Boggs et al. |
| 7,401,208 | B2 | 7/2008 | Kalla et al. |
| 7,424,579 | B2 | 9/2008 | Wheeler et al. |
| 7,480,706 | B1 | 1/2009 | Hooper et al. |
| 2001/0056456 | A1 | 12/2001 | Cota-Robles |
| 2003/0014473 | A1 | 1/2003 | Ohsawa et al. |
| 2003/0037228 | A1 | 2/2003 | Kelsey et al. |
| 2005/0071438 | A1 | 3/2005 | Liao et al. |

OTHER PUBLICATIONS

International Application No. PCT/US07/77910—International Search Report and Written Opinion of the International Searching Authority mailed Mar. 25, 2008.

*Primary Examiner* — Jeffrey Pwu
*Assistant Examiner* — Helai Salehi
(74) *Attorney, Agent, or Firm* — Miles & Stockbridge P.C.; David R. Schaffer

(57) ABSTRACT

A method of monitoring all network login activity, which includes a real-time analysis of intercepting all network login activity, analyzing network login activity, authenticating network login activity and closing (i.e., terminating) those network login connections that are not authenticated to proceed and access the network.

27 Claims, 5 Drawing Sheets

CREATING AND USING A SPECIFIC USER UNIQUE ID FOR SECURITY LOGIN AUTHENTICATION

CROSS REFERENCE TO RELATED INVENTION

This application claims benefit of priority to U.S. Provisional Patent Application No. 60/824,835, filed Sep. 7, 2006, which is herein incorporated in its entirety by reference. This application is a continuation of U.S. patent application Ser. No. 12/440,312, filed Mar. 5, 2010, which is a National Stage filing of Patent International Application Number PCT/US2007/077914, filed on Sep. 7, 2007 and amended on Mar. 9, 2009, both of which are hereby incorporated in their entireties by reference.

FIELD OF THE INVENTION

This method of invention relates generally to the field of network utility programming, and more particularly but not exclusively, to monitoring attempted network login connections, methods of intercepting network login activity, authenticating the network login and closing (terminating) those network login connections that are not authenticated to proceed and access a network.

BACKGROUND OF INVENTION

As networking and automation expands in business and organizations, one of the most important new technical capabilities in today's modern network computing is the ability for organizations to establish access to (host) networks via the Internet and other network service providers. In essence, organizations are allowing "connectivity" from their Local Area Network (LAN) from the Internet and any other public network, which can be accessed from the Internet. Many public corporations, private corporations, state and federal government, including the Department Of Defense, have established and made available a host LAN connection login access for employees from almost any place in the world. As an example, it would be very common for an employee working at home, to access the Internet and use the Internet to login to the host LAN made available by their employer. Once the individual user is granted login access to the host LAN, then it may be very possible for that user to have complete (i.e., 100%) access to that organization's Wide Area Network (WAN), or to probe the LAN, in an attempt to gain access to the remaining WAN.

Another important issue in today's modern computing environment is that individuals/employees/associates are provided mobile lap top personal computers (PCs), which are just as powerful, if not more powerful, than many standard desktop office computers. These lap top PCs may be used by individuals/employees/associates, while they are physically inside a facility accessing a host LAN and also while they are outside a facility to remotely access the host LAN via the Internet.

Because lap top PCs are becoming smaller and more powerful, along with many other computing devices, the theft of these lap top PCs and other computing devices is becoming much more common.

Another very important issue/problem is that the "cracking" of network system names and passwords to host LANs has now become a daily problem. Network system names and passwords can be determined using network tools that probe a network, while the network is continuously broadcasting information throughout the network domain. When the broadcast information is obtained, additional programs (i.e., tools) can be used to obtain an actual password to a networked computer. System names and passwords can also be obtained by "social engineering", such as an individual observing another individual user while they actually login and access the host LAN. Alternatively, an individual user may be provided an authorized system name and password to accomplish a certain task, but then that system name and password are not changed or deleted after the task is completed, so the individual user still has access using this system name and password.

Because of the problems described in the previous paragraphs, a new technology (i.e., utility) is needed, that has the ability to perform a network user login authentication, in order to insure the security of the (host) LAN during the time the user attempts to login and gain access to the (host) LAN.

SUMMARY

In accordance with an embodiment of the present invention, a method includes (i.e., comprises) executing and performing an analysis of a computer's internal hardware configuration (e.g., a 32/64-bit Microsoft computer's internal hardware configuration), reading the internal device hardware physically installed within the 32/64-bit Microsoft computer and generating a Unique ID based on the internal hardware configuration and the system name and password of the individual user.

BRIEF DESCRIPTION OF DRAWINGS

Non-limiting and non-exhaustive embodiments of the present invention are described with reference to the following figures, wherein like reference numerals refer to like parts throughout the various views unless otherwise precisely specified.

DETAILED DESCRIPTION OF ILLUSTRATED EMBODIMENTS

In the description herein, general details are provided in flow diagrams, to provide a general understanding of the programming methods that will assist in an understanding of embodiments of the inventive methods. One skilled in the relevant art of programming will recognize, however, that the inventive method can be practiced without one or more specific details, or in other programming methods. Referenced throughout this specification to "one embodiment" or "an embodiment" means that a particular feature, structure or characteristic described in connection with the embodiment is included in at least one embodiment of the present inventive method. Thus, the appearance of the phrases "in one embodiment" or "in an embodiment" in places throughout this specification are not necessarily all referring to the same embodiment. Furthermore, the particular features, structures, or characteristics may be combined in any suitable manner in one or more embodiments.

In accordance with one or more embodiments of the present invention, the O/S utility may be developed or implemented in a variety of programming languages ranging from low-level, programming languages (e.g., but not limited to, assembler) to high-level programming languages (e.g., but not limited to, C++, Visual Basic, Java, Java Beans, etc.). The O/S utility may be stored or encoded as an executable file on a machine-readable and/or a computer-readable medium (e.g., but not limited to, a floppy disk, a hard drive, a flash drive, a bubble memory, a Read Only Memory (ROM), a Random Access Memory (RAM), or the like) and/or hard-wired into one or more integrated circuits (e.g., an Electrically Erasable Programmable Read Only Memory (EEPROM), an Erasable Programmable Read Only Memory (EPROM), etc.).

Figure 1:
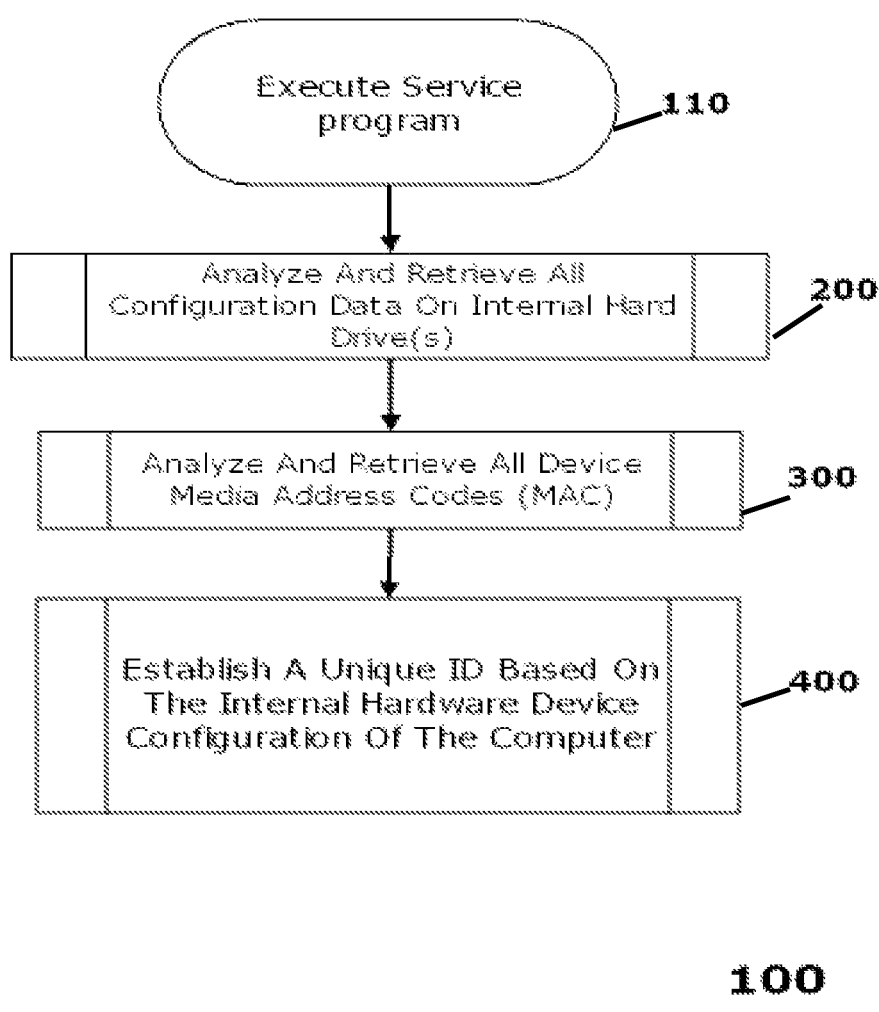
FIG. 1 is a general flow diagram of the mechanics and interlinks used to execute and perform a method to authenticate an individual user at the time the individual user attempts to login and gain access to a host, for example, a local area network (LAN), in accordance with one or more embodiments of the present invention.

FIG. 1 is a general flow diagram of the mechanics and interlinks used to execute and perform an analysis of the internal device hardware configuration and the creation of a Unique ID, based on an internal hard drive, combined Media Address Codes (MAC), at least one hard drive serial number and the individual user system name and password, in order to authenticate the individual user at the time the individual user attempts to login and gain access to a host LAN. In FIG. 1, there is shown an example of a general flow diagram of a service booting and executing (110) from the time the computer is powered on (i.e., booted-up) and sequentially reading (200) at least one internal hardware drive serial numbers and performing (300) an analysis on all Media Access Codes (MAC) and combining all of the Media Access Codes (MAC) into one string, along with the hard drive serial number and establishing (400) a Unique ID based on the internal hardware device configuration and the individuals system name and password information. Embodiments of the present invention are also contemplated in which at least one serial number may be used with an external hard drive and/or a removable hard drive.

Figure 2:
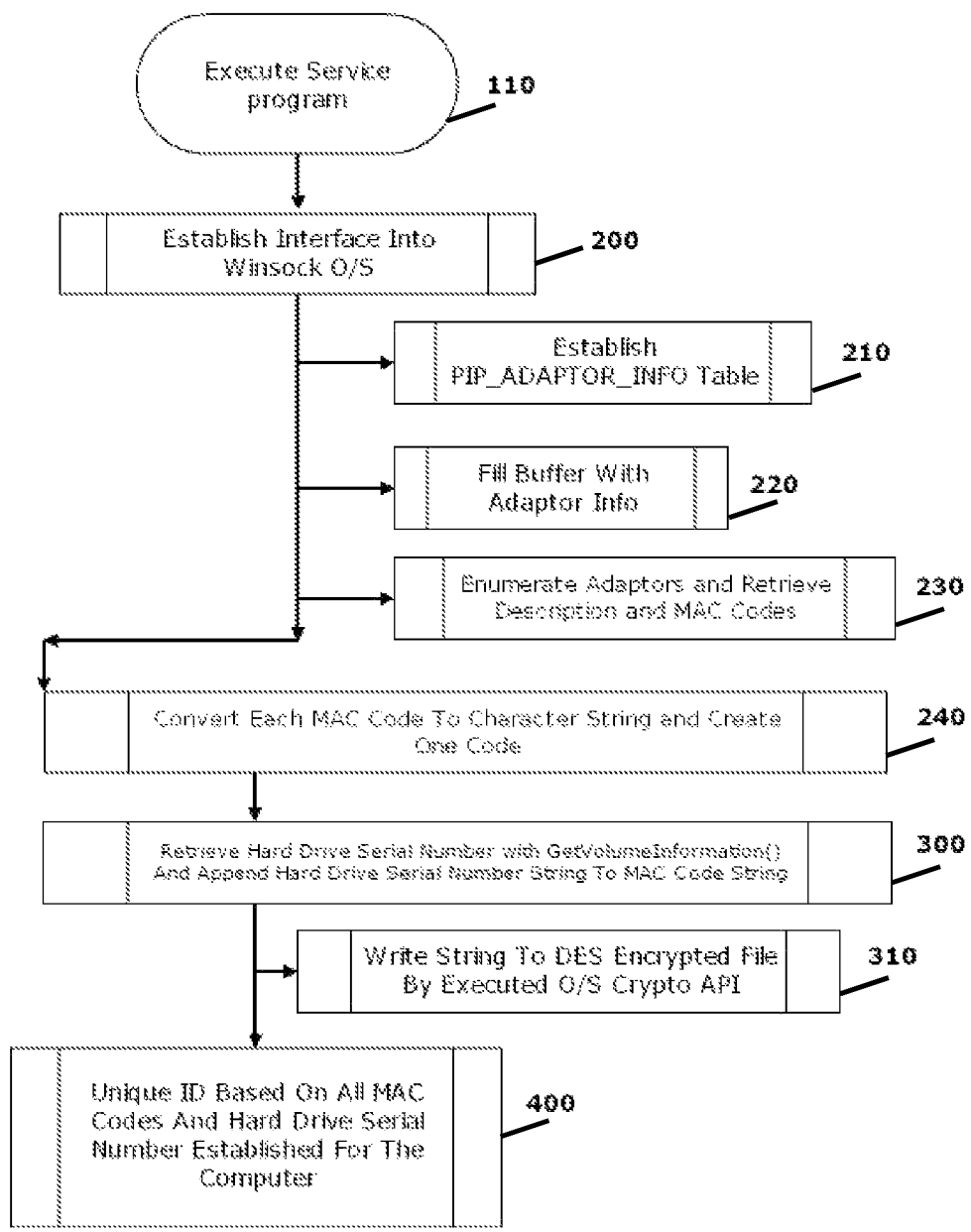
FIG. 2 is a detailed flow diagram of the mechanics used to perform an analysis of a computer, retrieve a hard drive serial number and all MAC codes, create a unique ID for an individual user and store the unique ID to an encrypted data file, in accordance with one or more embodiments of the present invention.

FIG. 2 is a detailed flow diagram of the mechanics used to perform an analysis of a computer, retrieve a hard drive serial number and all MAC codes, create a unique ID for an individual user and store the unique ID to an encrypted data file, in accordance with one or more embodiments of the present invention. In FIG. 2, there is shown a detailed flow diagram of how a computer performs (i.e., functions) to obtain and create the actual Unique ID and then store the Unique ID into an encrypted data file, for example, a data encryption standard (DES) or an advanced encryption standard (AES) data file. When the service program executes (110) it establishes (200) an interlink/interface into the operating system Winsock. The PIP_ADAPTER_INFO Table is established (210) in memory and the buffer is filled (220) with the adapter information. A function is called to enumerate (230) all adapters and retrieve each specific Media Access Code (MAC). Each Media Access Code is converted (240) to a string and each code is appended to form a string of all MACs within the computer. For example, if three MACs are recorded within the PIP_ADAPTER_INFO Table, all of the MACs would form a long string such as the following, where the "+" operators used in the equations below are string concatenation operators that operate to append strings together to form a longer string:

MAC 1+MAC 2+MAC 3=STRING (ALL COMBINED Media Access Codes)

This STRING (ALL COMBINED Media Access Codes) is combined (300) with the hard drive serial number, which is also converted to a character string prior to being combined and that may be retrieved by calling the GetVolumeInformation( ) function to create an Unique ID using the following equation:

Unique ID=STRING (ALL COMBINED Media Access Codes)+Hard Drive Serial Number

In those instances where more than one hard drive is present in the computer, some embodiments of the present invention may only use the primary (i.e., root) hard drive, for example, this is frequently the "C:\" drive. However, in other embodiments of the present invention, when more than one hard drive is present, serial numbers from two or more of the hard drives present may be used by converting them to strings and then appending them to the end of the STRING of MAC codes. In general, the root drive, for example, "C:\", will be used in each embodiment to calculate the Unique ID, but embodiments are contemplated in which the root drive may not be used.

The Unique ID may be encrypted (400) by initiating the operating system Crypto API and a DES or an AES Encrypted string that is stored to a data file.

Figure 3:
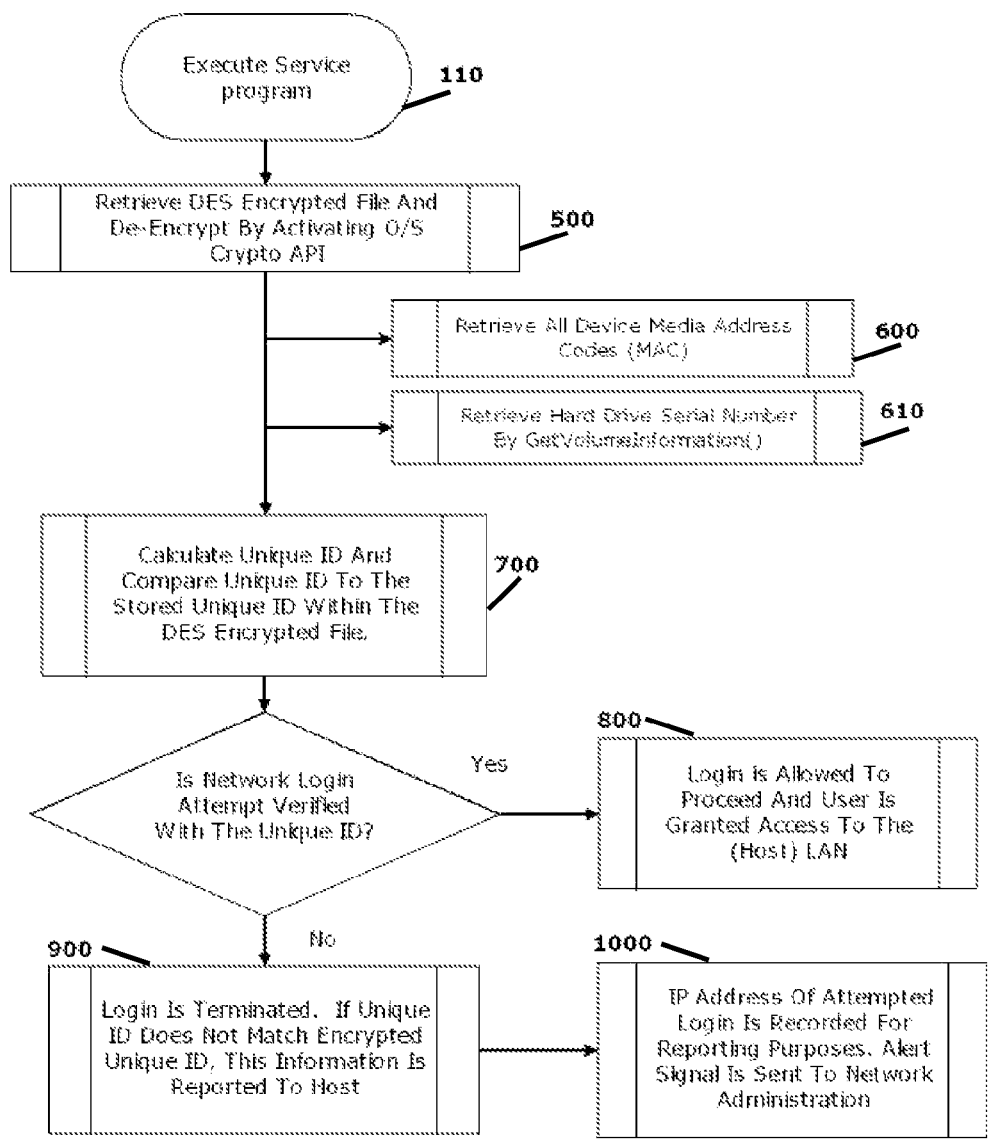
FIG. 3 is a detailed flow diagram of the mechanics that may occur after a Unique ID has been established for a user and stored to an encrypted data file, each time the user attempts to log into a network host, in accordance with one or more embodiments of the present invention.

FIG. 3 is a detailed flow diagram of the mechanics that may occur after a Unique ID has been established for a user and stored to an encrypted data file, each time the user attempts to log into a network host, in accordance with one or more embodiments of the present invention. In FIG. 3, there is shown a detailed flow diagram of how a computer performs (i.e., functions) after the Unique ID has been established (i.e., created) and stored to a DES or an AES encrypted data file within the computer. When the service program executes (110) a function may be executed (500) to retrieve read and de-encrypt the DES or AES file by activating the operating system Crypto API. Once the Unique ID is retrieved, de-encrypted and stored into memory, the Media Access Codes may again be retrieved (600) by establishing an interlink/interface into the operating system Winsock and reading the PIP_ADAPTER_INFO Table and enumerating all Media Access Codes (MAC). The hard drive serial number may be retrieved (610) by executing the GetVolumeInformation( ) function. The Unique ID may then be re-calculated and compared (700) to the Unique ID retrieved from the data file stored within the computer.

In accordance with and embodiment of the present invention, when the user attempts to log into the host, if the Unique ID matches the Unique ID stored on the host, the user is granted access (800) to the host LAN. If the Unique ID identified by the user (i.e., client) does not exist, because the user does not have an Unique ID stored on the host, or the Unique ID stored on the host for the user does not match the user Unique ID, the login session is terminated (900) and the IP Address of the attempted login is recorded (1000) and an alert is sent to network administration. For example, if a user attempts to login on to the host LAN from a different computer from which his/her Unique ID was created, they will not be able to login into the host LAN.

Figure 4:
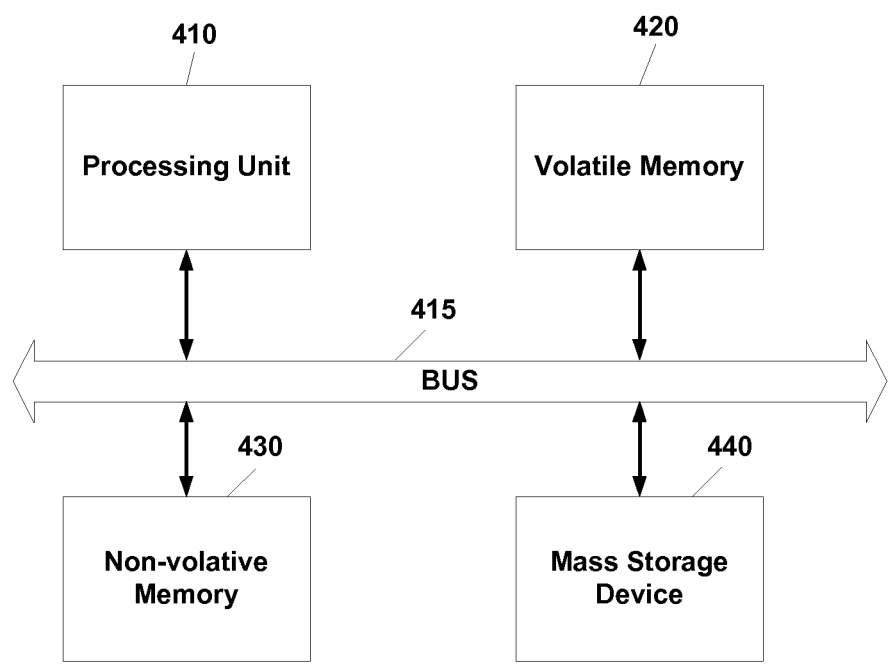
FIG. 4 is a block diagram of a computer system that may be used in accordance with an embodiment of the present invention.

FIG. 4 is a block diagram of a computer system that may be used in accordance with an embodiment of the present invention. In FIG. 4, a computer system 400 may include, but is not limited to, a processing unit (e.g., a processor) 410 connected to a bus 415 to enable processing unit 410 to have two-way communication across bus 415. Computer system 400 may also include a volatile memory (e.g., a random access memory (RAM)) 420 to store executable instructions and information/data to be used by the executable instructions when executed by processing unit 410. Computer system 400 may still further include a non-volatile memory (e.g., a read only memory (ROM)) 430 to store instructions and static information for processing unit 410, and a mass storage device (e.g., a hard disk drive, a compact disc (CD) and associated CD drive, an optical disk and associated optical disk drive, a floppy disk and associated floppy disk drive, etc.) 940 that each may also be connected to bus 415 to enable each to have two-way communication across bus 415. In operation, embodiments of the present invention may be resident in processing unit 410 while being executed. In operation, embodiments of the present invention may be resident in processing unit 1210 while being executed. For example, executing programmed instructions may cause processing unit 1210 to be configured to perform the functions described herein. The computer system illustrated in FIG. 4 provides the basic features of a computer/server system that may be used in conjunction with embodiments of the present invention.

It is contemplated that embodiments of the present invention may also be used with computer/server systems that include additional elements not included in computer system 400 in FIG. 4. For example, these addition elements may include, but are not limited to, additional processing units (e.g., parallel processing units, graphics processing units, etc.), bridges and/or interfaces to a variety of peripherals (e.g., monitor, keyboard, mouse, printer, joystick, biometric devices, speakers, external communications devices (e.g., a LAN, a WAN, a modem, a router, etc.)).

Additionally, any configuration of the computer system in FIG. 4 may be used with the various embodiments of the present invention. The executable instructions (i.e., computer program) implementing the present invention may be stored in any memory or storage device accessible to processing unit 410, for example, but not limited to, volatile memory 420, mass storage device 440, or any other local or remotely connected memory or storage device.

An embodiment of the present invention provides one or more means for implementing a programming design, capable of being applied to Microsoft C/C++ programs, that can initiate parallel threads to monitor almost an unlimited amount of events reported by the operating system in a real-time environment, without any noticeable performance degradation by the user and an extremely small impact to the overall computer usage, regarding CPU cycles (percentage) and memory utilization.

In accordance with one or more embodiments, each of the features of the present invention may be separately and independently claimed. Likewise, in accordance with one or more embodiments, each utility program, program, and/or code segment/module may be substituted for an equivalent means capable of substantially performing the same function(s).

Figure 5:
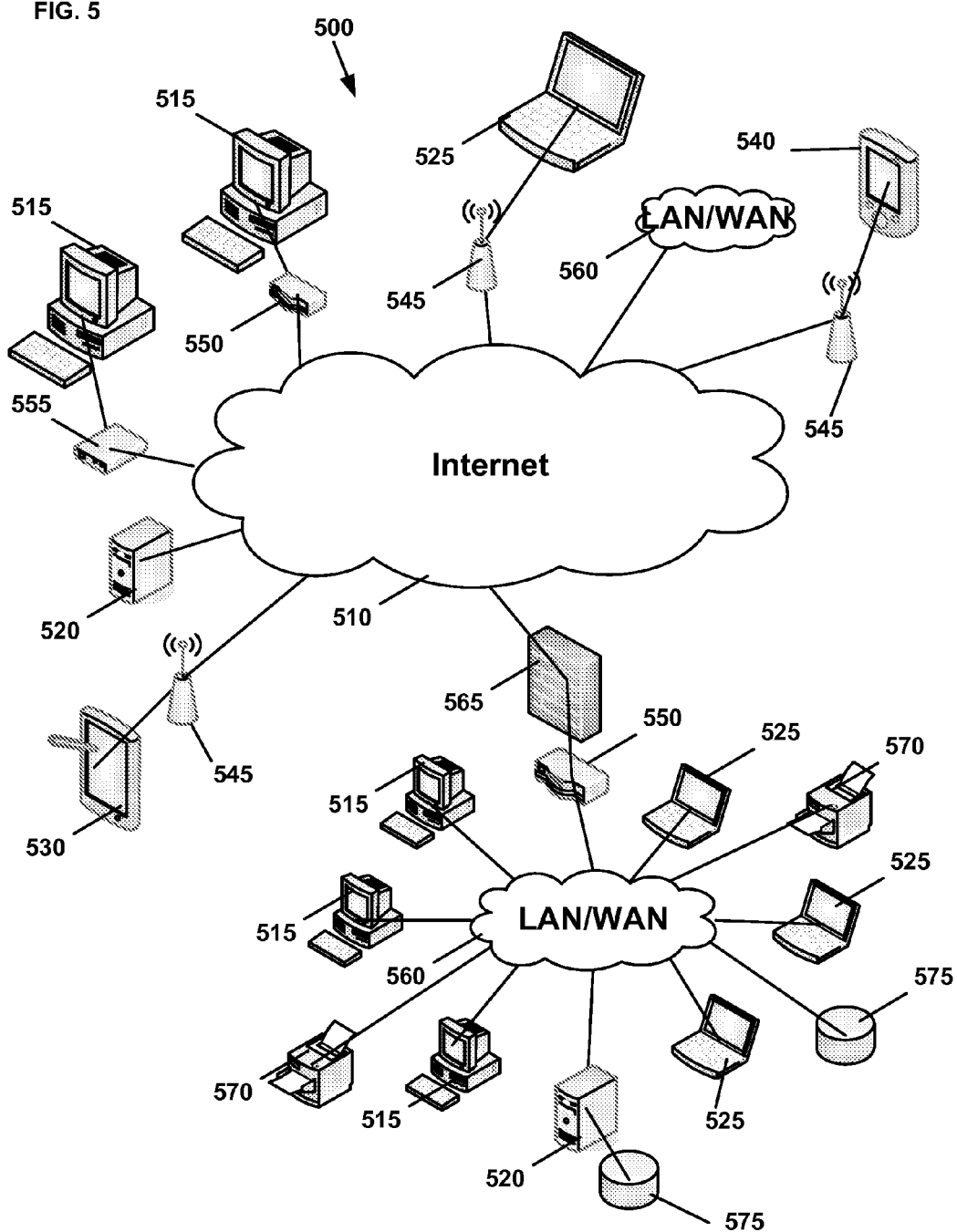
FIG. 5 is a diagram of a multiple network system that may be used together and/or separately in accordance with one or more embodiments of the present invention.

FIG. 5 is a diagram of a multiple network system that may be used together and/or separately in accordance with one or more embodiments of the present invention. In FIG. 5, Internet 510 may have connected to it a variety of computers, servers and communications devices. For example, multiple desktop personal computers (PCs) 515, servers 520, lap top PCs 525, tablet PCs 530, and personal digital assistants (PDAs) 540 may be connected to Internet 510 via a variety of communications means. The communications means may include wireless access points 545, such as seen connecting lap top PC 525, tablet PC 530, and PDA 540 to Internet 510; a router 550, as seen connecting a desktop PC to Internet 510; and a modem 555, as seen connecting another desktop PC to Internet 510. Internet 510 may also be connected to a LAN and/or WAN 560 via a firewall 565 and router 550. LAN and/or WAN 560 in turn may be directly connected to multiple desktop PCs 515, lap top PCs 525, multiple printers 570, one or more servers 520, and one or more mass storage devices 575, which may also be connected to one or more servers 520. Although the diagram in FIG. 5 is not exhaustive of all of the possible configurations and implementations, it is provided to illustrate a general network structure in which embodiments of the present invention may be implemented. Therefore, additional configurations and pieces of equipment are contemplated as being used with one or more embodiments of the present invention.

In accordance with one or more embodiments, each of the features of the present invention may be separately and independently claimed. Likewise, in accordance with one or more embodiments, each utility program, program, and/or code segment/module may be substituted for an equivalent means capable of substantially performing the same function(s).

An embodiment of the present invention provides one or more means for executing and performing an analysis of a 32/64-bit Microsoft computer's internal hardware configuration, reading the internal device hardware physically installed within the 32/64-bit Microsoft computer and generating a Unique ID based on the internal hardware configuration and the system name and password of the individual (user).

In accordance with an embodiment of the present invention, a method of retrieving all Media Access Codes (MAC) includes retrieving a hard drive serial number and a combined all Media Access Codes with the hard drive serial number and creating a Unique ID.

In accordance with an embodiment of the present invention, a method includes implementing a Unique ID as part of a user login authentication to a network and verifying that a physical computer logging into the network is a correct computer.

In accordance with an embodiment of the present invention, a method as substantially shown and described herein.

In accordance with another embodiment of the present invention, a system and method as substantially shown and described herein.

In accordance with yet another embodiment of the present invention, a computer and method as substantially shown and described herein.

In accordance with still another embodiment of the present invention, a computer network and method as substantially shown and described herein.

Although the present invention has been disclosed in detail, it should be understood that various changes, substitutions, and alterations can be made herein. Moreover, although software and hardware are described to control certain functions, such functions can be performed using either software, hardware or a combination of software and hardware, as is well known in the art. Other examples are readily ascertainable by one skilled in the art and can be made without departing from the spirit and scope of the present invention as defined by the following claims.

What is claimed is:

1. A method of providing a secure network user login procedure for a network, the method comprising:

retrieving configuration data on at least one hard drive in a computer connected to the network, including a serial number for the at least one hard drive;

retrieving all media access codes associated with the computer; converting each of the media access codes to a character string and appending all of the media access code character strings together to form a single, long character string of all of the media access code strings;

creating an unique identification (ID) for the computer by converting the serial number for the at least one hard drive to a character string, and appending the character string of the at least one serial number to the single, long character string of all of the media access code strings to create the unique ID for the computer;

encrypting the unique ID; and storing the encrypted unique ID in a data file on the computer.

2. The method of claim 1 wherein the retrieving configuration data on at least one hard drive in a computer connected to the network, including the serial number for the at least one hard drive, and retrieving the media access codes occurs immediately after the computer is powered-on.

3. The method of claim 1 wherein the encrypting the unique ID comprises: initiating an operating system crypto application programming interface to encrypt the unique ID.

4. The method of claim 1 further comprising:

retrieving and decrypting the unique ID and storing it in the memory of the computer;

retrieving configuration data on at least one hard drive in the computer, including the serial number for the at least one hard drive;

retrieving all media access codes associated with the computer; converting each of the media access codes to a character string and appending all of the media access code character strings together to form a new single, long character string of all of the media access code strings;

creating a new unique identification (ID) for the computer by converting the serial number for the at least one hard drive to a character string, and appending the character string for the serial number for the at least one hard drive to the new single, long character string of all of the media access code strings to create the new unique ID for the computer;

comparing the new unique ID to the unique ID and, if the new unique ID matches the unique ID, then grant access to the network, otherwise, terminate the login attempt and report an invalid login attempt.

5. The method of claim 3 wherein the unique ID is encrypted using a data encryption standard algorithm or an advanced encryption standard algorithm.

6. The method of claim 4 wherein the report invalid login attempt comprises: reporting the invalid login attempt to the network; recording the IP address of the invalid login attempt; and sending an alert signal to a network administrator that the invalid login attempt occurred.

7. A non-transitory machine-readable medium having stored thereon a plurality of executable instructions for performing a method of providing a secure network user login procedure for a network, the method comprising:

retrieving configuration data on at least one hard drive in a computer connected to the network, including a serial number for the at least one hard drive;

retrieving all media access codes associated with the computer; converting each of the media access codes to a character string and appending all of the media access code character strings together to form a single, long character string of all of the media access code strings;

creating an unique identification (ID) for the computer by converting the serial number for the at least one hard drive to a character string, and appending the character string of the at least one serial number to the single, long character string of all of the media access code strings to create the unique ID for the computer;

encrypting the unique ID; and storing the encrypted unique ID in a data file on the computer.

8. The machine-readable medium of claim 7 wherein the retrieving configuration data on at least one hard drive in the computer connected to the network, including the serial number for the at least one hard drive, and retrieving the media access codes occurs immediately after the computer is powered-on.

9. The machine-readable medium of claim 7 wherein the encrypting the unique ID comprises:

initiating an operating system crypto application programming interface to encrypt the unique ID.

10. The machine-readable medium of claim 7 wherein the method further comprises:

retrieving and decrypting the unique ID and storing it in the memory of the computer;

retrieving configuration data on at least one hard drive in the computer, including the serial number for the at least one hard drive;

retrieving all media access codes associated with the computer;

converting each of the media access codes to a character string and appending all of the media access code character strings together to form a new single, long character string of all of the media access code strings;

creating a new unique identification (ID) for the computer by converting the serial number for the at least one hard drive to a character string, and appending the character string serial number for the at least one hard drive to the new single, long character string of all of the media access code strings to create the new unique ID for the computer;

comparing the new unique ID to the unique ID and, if the new unique ID matches the unique ID, then grant access to the network, otherwise, terminate the login attempt and report the invalid login attempt.

11. The machine-readable medium of claim 9 wherein the unique ID is encrypted using a data encryption standard algorithm or an advanced encryption standard algorithm.

12. The machine-readable medium of claim 10 wherein the report invalid login attempt comprises:

reporting the invalid login attempt to the network; recording the IP address of the invalid login attempt; and sending an alert signal to a network administrator that the invalid login attempt occurred.

13. A method of providing a secure network user login procedure for a network, the method comprising:

retrieving configuration data on at least one hard drive in a computer, including a serial number for the at least one hard drive;

retrieving all media access codes associated with the computer;

converting each of the media access codes to a character string and appending all of the media access code character strings together to form a single, long character string of all of the media access code strings;

creating a unique identification (ID) for the computer by converting the serial number for the at least one hard drive to a character string, and appending the character string serial number for the at least one hard drive to the single, long character string of all of the media access code strings to create the unique ID for the computer;

comparing the unique ID to a previously created unique ID for the computer and, if the unique ID matches the previously created unique ID, then grant access to the network, otherwise, terminate the login attempt and report the invalid login attempt.

14. The method of claim 13 wherein the previously created unique ID was created by the method comprising:

retrieving configuration data on at least one hard drive in the computer connected to the network, including the serial number for the at least one hard drive; retrieving all media access codes associated with the computer; converting each of the media access codes to initial character strings and appending all of the media access code initial character strings together to form an initial single, long character string of all of the media access code strings; and creating the previously created unique ID for the computer by converting the serial number for the at least one hard drive to a character string, and appending the character string serial number for the at least one hard drive to the initial single, long character string of all of the media access code strings to create the initial unique ID for the computer.

15. The method of claim 13 wherein the report invalid login attempt comprises:

reporting the invalid attempt to the network; recording the IP address of the invalid login attempt; and sending an alert signal to a network administrator.

16. The method of claim 13 wherein the retrieving configuration data on the at least one hard drive in the computer connected to the network, including the serial number for the at least one hard drive, and retrieving the media access codes occurs immediately after the computer is powered-on.

17. The method of claim 13 wherein the previously created unique ID is retrieved and decrypted from an encrypted, previously created unique ID stored in a data file on the computer and the decrypted previously created unique ID is stored in the memory of the computer occurs immediately after the computer is powered-on.

18. A non-transitory machine-readable medium having stored thereon a plurality of executable instructions for performing a method of providing a secure network user login procedure for a network, the method comprising:

retrieving configuration data on at least one hard drive in a computer, including a serial number for the at least one hard drive;

retrieving all media access codes associated with the computer;

converting each of the media access codes to a character string and appending all of the media access code character strings together to form a single, long character string of all of the media access code strings;

creating a unique identification (ID) for the computer by converting the serial number for the at least one hard drive to a character string, and appending the character string serial number for the at least one hard drive to the single, long character string of all of the media access code strings to create the unique ID for the computer;

comparing the unique ID to a previously created unique ID for the computer and, if the unique ID matches the previously created unique ID, then grant access to the network, otherwise, terminate the login attempt and report the invalid login attempt.

19. The machine-readable medium of claim 13 wherein the previously created unique ID was created by the method comprising:

retrieving configuration data on the at least one hard drive in the computer connected to the network, including the serial number for the at least one hard drive;

retrieving all media access codes associated with the computer; converting each of the media access codes to initial character strings and appending all of the media access code initial character strings together to form an initial single, long character string of all of the media access code strings; and creating the previously created unique ID for the computer by converting the serial number for the at least one hard drive to a character string, and appending the character string serial number for the at least one hard drive to the initial single, long character string of all of the media access code strings to create the initial unique ID for the computer.

20. The machine-readable medium of claim 18 wherein the report invalid login attempt comprises:

reporting the invalid attempt to the network; recording the IP address of the invalid login attempt; and sending an alert signal to a network administrator.

21. The machine-readable medium of claim 18 wherein the retrieving configuration data on the at least one hard drive in the computer connected to the network, including the serial number for the at least one hard drive, and retrieving the media access codes all occurs immediately after the computer is powered-on.

22. The machine-readable medium of claim 18 wherein the previously created unique ID is retrieved and decrypted from an encrypted, previously created unique ID stored in a data file on the computer and the decrypted previously created unique ID is stored in the memory of the computer occurs immediately after the computer is powered-on.

23. An apparatus for performing a method of providing a secure network user login procedure for a network, the apparatus comprising:

means for retrieving configuration data on at least one hard drive in a computer, including a serial number for the at least one hard drive;

the means for retrieving configuration data being stored on at least one hard drive;

means for retrieving all media access codes associated with the computer; means for converting each of the media access codes to a character string and appending all of the media access code character strings together to form a single, long character string of all of the media access code strings;

means for creating a unique identification (ID) for the computer by converting the serial number for the at least one hard drive to a character string, and appending the character string serial number for the at least one hard drive to the single, long character string of all of the media access code strings to create the unique ID for the computer;

means for comparing the unique ID to a previously created unique ID for the computer and, if the unique ID matches the previously created unique ID, then grant access to the network, otherwise, terminate the login attempt and report the invalid login attempt.

24. The apparatus of claim 23 wherein the previously created unique ID was created by an initial use of the apparatus.

25. The apparatus of claim 23 wherein the report invalid login attempt comprises: reporting the invalid attempt to the network; recording the IP address of the invalid login attempt; and sending an alert signal to a network administrator.

26. The apparatus of claim 23 wherein the means for retrieving configuration data on the at least one hard drive in the computer connected to the network, including the serial number for the at least one hard drive, and retrieving the media access codes all operates immediately after the computer is powered-on.

27. The apparatus of claim 23 wherein the previously created unique ID is retrieved and decrypted from an encrypted, previously created unique ID stored in a data file on the computer and the decrypted previously created unique ID is stored in the memory of the computer occurs immediately after the computer is powered-on.

* * * * *